May 5, 1936.  A. P. DOUGHERTY ET AL  2,039,299
ICE CAN GRID
Filed March 16, 1935
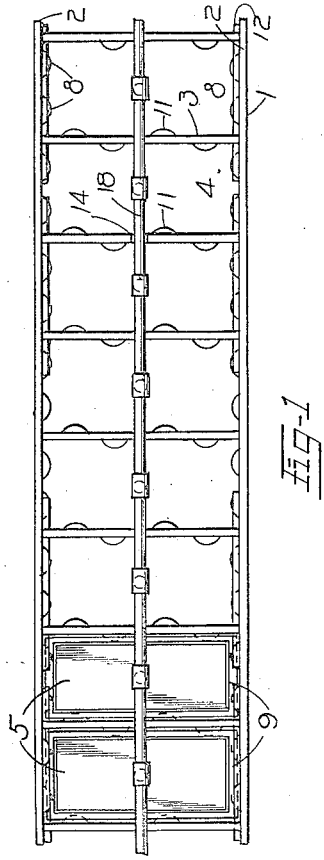
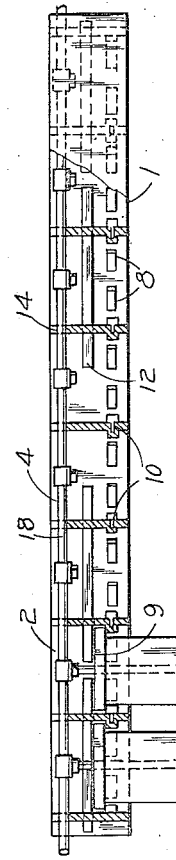
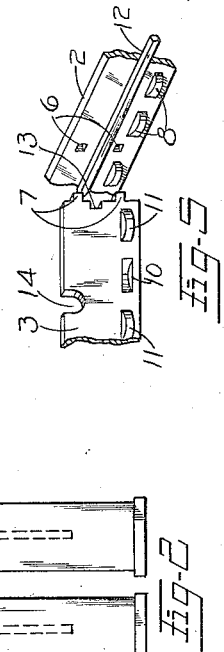
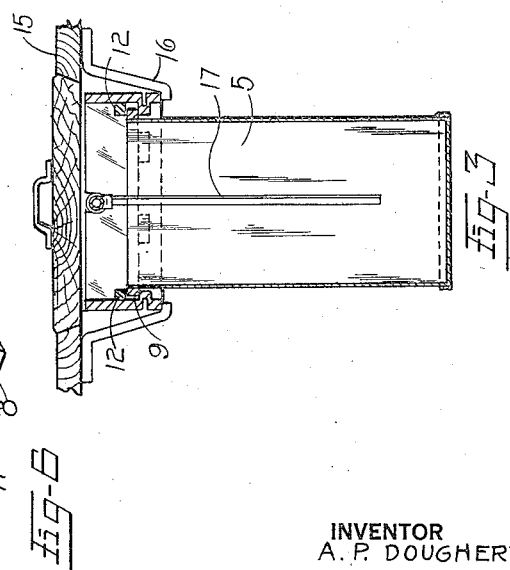
INVENTOR
A. P. DOUGHERTY AND
W. H. STEVENS.
BY
ATTORNEYS Patented May 5, 1936

2,039,299

UNITED STATES PATENT OFFICE 2,039,299

ICE CAN GRID

Augustus P. Dougherty, Warren, and William H. Stevens, Niles, Ohio

Application March 16, 1935, Serial No. 11,502

3 Claims. (Cl. 62—157)

Our invention relates to improvements in can grids of the type employed in the harvesting of manufactured ice, in which a plurality of freezing cans may be conveniently lifted as a unit from the usual brine tank and the ice cakes dumped from the cans. These prior can grids comprise a ladder like frame made up of flat longitudinal side bars connected at intervals by cross bars or members thus providing a plurality of substantially rectangular openings in which the freezing cans were inserted, with the rims of the can resting upon and supported by the longitudinal bars or cross bars.

Due to the great strain on the longitudinal bars and cross bars, and particularly on the longitudinal bars of these grids, it has been necessary in actual practice for the manufacturer to allow and provide for considerable camber under stress of every day use. This practically precluded the possibility of evenly supporting the cans on all four sides, so essential to the economical harvesting of the ice from the grids.

The present invention has for an object to overcome the above and other objections by embossing the side and cross bars to reinforce the longitudinal bars against camber and to provide integral protuberances on which the freezing cans may be evenly supported on all four sides. Another object of the invention is to provide a can grid which can be economically manufactured and so constructed that the members thereof can be readily assembled at any desired point.

Other objects and advantages of the invention will be apparent as the description is considered with the accompanying drawing, in which:

Figure 1 is a plan view of the grid showing two freezing cans and the air line in place;

Figure 2 is a side elevation of the grid shown in Figure 1;

Figure 3 is an end view partly in section showing the planking for covering the brine vat in place;

Figure 4 is a fragmentary plan view of a modified form of grid;

Figure 5 is a detail fragmentary side view of one of the cross bars and a fragmentary perspective of one of the side bars, showing the manner of assembling the parts of the grid; and Figure 6 is a fragmentary side view of one of the side bars and two cross bars shown in the Figure 4 modified form of the invention.

Referring more particularly to the drawing, I denotes a grid or frame consisting of two longitudinal members or bars 2 connected at intervals by cross members or bars 3, thus providing substantially rectangular openings 4, for loosely receiving freezing cans 5. The grid shown is designed to carry eight cans but it will be understood that provision may be made for any desired number of cans. The bars 2 and 3 are preferably made of bar steel.

The longitudinal side members or bars 2 are provided with spaced apertures 6 adapted to receive a pair of lugs 7 formed on each end edge of the cross members or bars. These lugs may be secured to the side members in any desired manner, as by peaning or welding. The side members 2 are also embossed to provide bosses 8, adjacent their lower edges upon which rests the narrow sides of a reinforcing band 9, with which the freezing cans are provided. The embossing operation is effected by stamping while the bars are hot and consists in forcing the metal laterally so that the bosses 8 project from the inner side or face of the bars, there being a corresponding depression 10 on the other side of the bar opposite each boss.

Each cross bar 3 is embossed in a similar manner to that just described, to provide supporting bosses 11 for engagement by the long sides of the freezing cans. The bosses 11 are identical with and located in the same horizontal plane as the bosses 8, however the former bosses are formed on both sides of the cross bars, with the exception of the two bars at the end of the grid. After the freezing cans have been inserted in the grid with their top reinforcing bands evenly supported on all four sides by the bosses 8 and 11, the cans are clamped securely in place by means of a plurality of rods 12, inserted through notches 13, formed in the ends of the cross bars at a point spaced above the bosses 8 and 11 a distance equal to or slightly greater than the height of the band 9, so that the rods will snugly engage the top edge of the band. It will of course be understood that one long rod 12 at each side of the grid may be effectively employed in lieu of the series of bars shown.

An air pipe 18 for providing aeration to the cans during the freezing process, is seated in semi-circular notches 14 formed in the top edges of the cross bars 3. The air pipe is thus supported in a horizontal plane slightly below the top edge of the grid so that planking 15 commonly used to cover the brine tanks will lie evenly on the planking and grid supports 16. Sections of hose or pipes 17 depend from the air supply pipe 18, into the individual freezing cans, for an obvious purpose.

The modified form of grid disclosed in Figures 4 and 6 is identical with the preferred embodiment with the exception that two spaced cross bars 3' are employed instead of the single bars 3, and the bars 3' are embossed on one side only. Of course, when the spaced cross bars 3' are used, it will be necessary to provide the side bars 2 with additional apertures 6', as shown in Figure 6.

The bosses 8 and 11 on the respective side and cross bars 2 and 3 in addition to providing a stable and even support for the freezing cans, strengthen the bars and particularly the side bars, against camber during the operation of lifting and tipping the grid, with the cans therein, which may be carried out according to common practice. It will also be noted that the bosses 8 and 11 can be so located in any bar used in making up the grid, that the overall depth of any individual can may be flexibly regulated within a considerable range; also that by increasing the extent to which the bosses extend into the openings 4, considerable flexibility as to the shifting of the can centers is provided for.

Having thus described our invention, what we claim is:

1. A grid for ice cans comprising, in combination, substantially parallel side members and cross members for supporting said cans, integral embossed means on said side and cross members for engagement with the top reinforcing bands of the cans and means engageable with the tops of the cans for clamping them against displacement.

2. A grid for ice cans comprising side and cross members for supporting said cans, integral embossed means on said side and cross members for engagement with all four sides of the top reinforcing bands of said cans and means engageable with the tops of the cans for clamping them against displacement.

3. A grid for ice cans comprising side and cross members for supporting said cans, integral embossed means on said side and cross members for engagement with all four sides of the top reinforcing bands of said cans, said cross members being notched and removable means passing through said notches and engageable with the tops of the cans for clamping them against displacement.

AUGUSTUS P. DOUGHERTY.
WILLIAM H. STEVENS.